United States Patent

[11] 3,612,386

| [72] | Inventors | John Gibson<br>Penn, Wolverhampton;<br>Alan Woodall, Claverley, Wolverhampton,<br>both of England |
|---|---|---|
| [21] | Appl. No. | 852,441 |
| [22] | Filed | Aug. 22, 1969 |
| [45] | Patented | Oct. 12, 1971 |
| [73] | Assignee | John Thompson (Pipework and Ordnance Division) Limited<br>Wolverhampton, England |
| [32] | Priority | Feb. 17, 1967 |
| [33] | | Great Britain |
| [31] | | 7377/67 |
| | | Continuation-in-part of application Ser. No. 689,876, Dec. 21, 1967, now abandoned. |

[54] APPARATUS FOR FRICTION WELDING
8 Claims, 5 Drawing Figs.

[52] U.S. Cl. .................................................. 228/2,
29/470.3, 156/73
[51] Int. Cl. ........................................................ B23k 27/00

[50] Field of Search........................................... 228/2;
29/470.3; 156/73

[56] References Cited
UNITED STATES PATENTS

| 3,235,162 | 2/1966 | Hollander.................. | 29/470.3 |
| 3,314,583 | 4/1967 | Roberts...................... | 228/2 |
| 3,388,849 | 6/1968 | Blum et al................... | 228/2 |

Primary Examiner—John F. Campbell
Assistant Examiner—Robert J. Craig
Attorney—Kurt Kelman ABSTRACT: A friction welding machine for joining together two workpieces by the interposition of a third insert workpiece, the latter having an external cylindrical surface. The machine includes respectively hydraulically actuated clamping devices for holding the free workpieces. The clamping device for the insert workpiece includes two free rollers, defining in combination a cusp-shaped channel, supported by backing rollers driven from a motor and a third pressure roller movable to press the insert workpiece into engagement with the two free rollers so that the insert workpiece is rotated thereby.

APPARATUS FOR FRICTION WELDING

CROSS-REFERENCE TO RELATED APPLICATION

This application is filed as a continuation in part from application Ser. No. 689,876 filed Dec. 21, 1967, now abandoned.

BACKGROUND OF THE INVENTION

1. Field of the Invention

This invention relates to apparatus for friction welding and has been developed primarily but not exclusively for use in the metal wire industry wherein it is required to join together in end-to-end relation end portions of two lengths of wire each forming a bulk supply and stored in coiled form, for example, by being wound on to a drum. One of the reasons why such lengths of wire are required to be joined is to increase the total length of wire which can be fed in extended form along a feed path through apparatus of various kinds in which the wire undergoes further treatment, whereby such treatment can be carried on with the minimum number of stoppages, or possibly continuously in some cases where the coils of wire are of such form that both end portions are accessible so that the outer or leading end of one coil can be joined to the inner or trailing end of the preceding coil.

One of the problems encountered in making joints of this kind is that, due to the form in which the wire is stored, i.e. coiled form, it would be difficult or expensive to effect junction by friction welding with the end faces of the two end portions of the coils respectively held in abutting coaxial relation, whilst one of the coils was rotated bodily relatively to the other about the common axis of the two end portions.

The present invention is particularly concerned with an apparatus for friction welding for use where one of the workpieces is of unusually small diameter. 2. Description of the Prior Art To overcome or reduce the problem of joining end portions of wire coils it has been proposed to place between the end faces of the two end portions of the wire a further (short) wire insert of the same cross-sectional shape and dimensions as the wire contained in the two bulk supplies or coils and to effect rotation of the insert whilst holding the end portions of the two bulk supplies or coils stationary, the requisite rotary motion being supplied to the insert means of an axially split or divided collet and a pair of slotted sleeves embracing the collet externally and each formed with a helical slot enabling such sleeve to be removed from the insert after friction welding has taken place between both the end faces of the insert and the adjacent end faces of the stationarily held end portions of the two bulk supplies or coils.

One of the disadvantages of this is the necessity for performing assembly and disassembly of the collets and sleeves which form the rotary driving means for the insert, which operations are time consuming.

Further, friction welding necessitates relative rotation between the workpieces to be joined at a rate, i.e. number of revolutions per minute, the optimum value of which varies in accordance with the values of the other parameters, namely the material of which the workpieces are formed, the cross-sectional dimension of the abutting faces to be friction welded and the axial load applied to their workpieces. Typically this rate of rotation is in the range 1000 to 5000 r.p.m. for circular cross section workpieces of steel ranging from 1½" diameter down to ⅜" diameter.

High speed rotation of a driving member in the range 3000 to 5000 r.p.m. necessitates accurate balancing and carefully designed bearings to avoid or minimize radial excursions of the driving member from the desired axis of rotation due to out of balance forces which, if transmitted to one of the workpieces, can lead to an unsatisfactory welded joint, e.g. one in which there is misalignment between the axes of the workpieces to be joined.

The object of the present invention is generally to provide an improved apparatus for friction welding which reduces the number of revolutions per minute at which the driving member associated with one of the workpieces has to be rotated to achieve a given number of revolutions per minute of such workpiece thereby overcoming or minimizing the disadvantageous effects of out-of-balance forces so far as the general application of the invention is concerned, and more specifically to provide a more convenient means of rotating a third workpiece to be connected between two other workpieces, for example an insert so far as the invention is concerned in its application to welding together lengths of wire forming bulk supplies of this material or a shaft or the like so far as the invention is concerned with forming other articles.

SUMMARY OF THE INVENTION

From one aspect, the present invention resides in the improvement in friction welding apparatus for joining at least one first workpiece to a second workpiece of circular cross section and having an exterior curved surface, wherein workpiece support means for said second workpiece are provided and comprise a workpiece locating means including a plurality of roller elements arranged at positions spaced apart angularly about the axis of said second workpiece and collectively defining an aperture in which said second workpiece can be located, and at least two of said roller elements which occupy angularly successive positions comprise free roller elements and are supported only by backing roller elements, such roller elements each having an outer curved face of external diameter a plurality of times greater than the maximum diameter workpiece capable of being held by the support means and arranged to engage directly the exterior curved face of said second workpiece, and driving means being provided for rotating at least one of said roller elements which engages the exterior curved surface of said second workpiece so as to rotate the latter by frictional engagement therewith.

Conveniently said driving means is arranged to transmit drive to at least one of the backing roller elements which in turn transmits drive to said second workpiece by way of at least one of said free roller elements.

A preferred form of the apparatus is designed for joining two such first workpieces by the interposition of said second workpiece centrally therebetween.

The diameter of the backing roller elements is preferably at least twice that of the free roller elements which they support.

One advantage of the invention is that the diameters of the free roller elements can be reduced to provide convenient geometry in respect of the workpiece receiving aperture, whereby the latter is adapted to support a small diameter workpiece (for example in the range 0.10" to 0.50"), and these free roller elements can extend axially to a position immediately adjacent the plane in which the welded junction is to take place, or each of these planes where the support is adapted to receive an insert workpiece, there being no internal or external bearings required for supporting the free roller elements.

BRIEF DESCRIPTION OF THE DRAWINGS

The invention will now be described with reference to the accompanying drawings wherein.

DESCRIPTION OF THE PREFERRED EMBODIMENT

Figure 1:
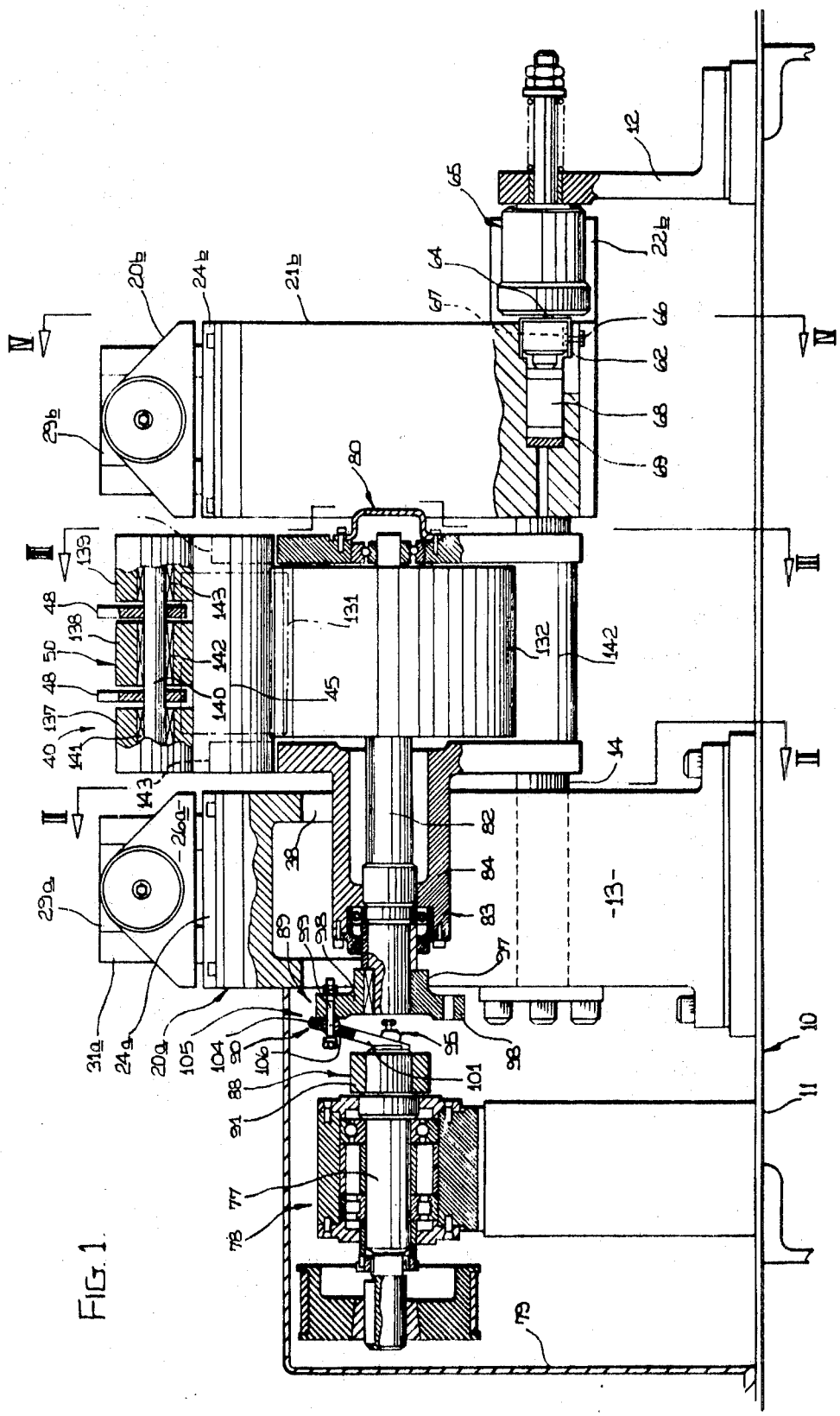
FIG. 1 is a view in side elevation, and partly in vertical cross section, of one apparatus in accordance with the invention for carrying out the method thereof.

Referring to FIGS. 1 to 5, the apparatus comprises a supporting means or body structure 10 including a base plate 11 on to which is bolted at one end an L-shaped end plate 12 and which, at the opposite end, has upstanding end posts 13 secured thereto. The end plate 12 and respective posts 13 serve to support opposite ends of a pair of laterally spaced guide bars 14.

On the guide bars are mounted workpiece supporting means comprising three workpiece supports, namely two outer or end supports 20a, 20b and an inner or central support 40. The two outer supports 20a, 20b are for supporting the workpieces comprising end portions of two lengths of wire which may be bulk supplies of wire in coiled form required to be welded to each other end-to-end, whilst the central support 40 is for supporting a further workpiece comprising an insert length of wire, it being assumed that all these lengths of wire are of the same cross-sectional shape and dimensions and either of the same composition of metal or of metals capable of being welded to each other.

Since the end supports 20a, 20b are of largely similar construction those parts of common design will be described in respect only of one of these supports, like parts of the respective end supports being identified by like reference numerals with the suffix a, or b, as appropriate. Thus the following description of the end support 20a is equally applicable to the other end support 20b, the description relative to the other end support 20b being confined to any differences.

The end support 20a comprises a body part 21a which includes spaced sleevelike portions 22a through which pass the respective guide bars 14, these portions 22a being integrally connected with each other by a bridge portion 23a. The bridge portion 23a serves to support workpiece locating means comprising a rest or cradle member 24a which may be formed as a structurally separate component secured by machine screws to the bridge portion. The cradle member 24a, in transverse vertical cross section, affords an upwardly presented channel 25a of cusp-shape, that is to say the sides of the channel comprise respective convex part cylindrical surfaces of notional cylinders which meet tangentially in a vertical medial plane extending longitudinally of the rest or cradle member.

Above the cusp-shaped channel 25a the end support 20a includes clamping means in the form of a plate 26a, the lower surface 27a of which is either planar as shown or formed with an inverted V-shaped groove the apex of which lies on said median plane. The planar lower surface, or the faces of such groove, engages the upper side of an end portion of wire seated in the cusp-shaped channel 25a of the rest or cradle member 24a and holds such piece of wire tight against both axial movement and movement radially with respect to the axis of the wire.

The clamping plate 26a is supported in a manner permitting it to swivel about a transverse horizontal axis defined by a spigot 28a at the inner end of a carrier arm 29a itself pivoted about a longitudinal axis on a pin 30a extending between trunnions 31a projecting upwardly from the bridge portion 23a of the support 20a.

At its outer end the carrier arm 29a is pivotally connected by a pin 32a to a pair of forks 33a at the end of an upwardly extending piston rod 34a of a piston and cylinder unit 35a mounted pivotally on a pin 36a between laterally projecting lugs 37a on the end support 26a. The piston and cylinder unit 35a is extendable and contractable to move the clamping plate 26a between closed and open position with respect to the underlying rest or cradle members 24a so as to release or grip any piece of wire located in the channel 25a of the latter.

Both end supports 20a, 20b are similar in respect of the parts thus far described.

The central support 40 also includes a body part 41 supported on the guide bars 14 by sleevelike portions 42 integrally connected by a bridge portion 43. The central support 40 is designed to support a circular sectional central workpiece for rotation about its longitudinal axis, and also to transmit drive to said central workpiece in order to rotate the latter about its longitudinal axis by frictional engagement with a number of roller elements which collectively define a workpiece receiving aperture which locates the workpiece against radial displacement. The central support is particularly designed for use with central workpieces having a small diameter, typically less than about 0.5", and a number of problems arise in relation to the construction and design of this support.

To achieve a satisfactory welded junction by friction welding between two or three workpieces, it is necessary that the small diameter workpiece, or both or all of the workpieces if they are both or all of small diameter, should be supported against radial displacements with respect to the common axis with which they must be aligned at positions which are very close to the plane of the contacting faces at which the welded junction is to be made.

The roller elements which define the workpiece receiving aperture must be at least three in number and it is, in practice, difficult or impractical to support these roller elements by means of internal bearings (because the diameter of at least two of the roller elements has to be made small enough to achieve the required geometry in respect of the aperture conveniently and satisfactorily to support a small diameter workpiece) and difficult or impracticable to support these roller elements by external bearings (because such bearings would form an obstruction at the plane of the welded junction preventing the roller elements affording support to the workpiece sufficiently close to such plane).

Whilst this problem is generally applicable to a friction welding apparatus in which one of the workpieces is driven by means of rollers, it is especially acute in cases (such as the apparatus shown in FIGS. 1–5) where the friction welding apparatus contains three workpiece supports spaced apart along the common axis, the central support being adapted to support an insert workpiece at its opposite ends to its adjacent end of two outer workpieces held respectively by the remaining supports of the apparatus.

As mentioned previously this form of friction welding apparatus has particular application in the metal wire industry wherein it is required to join together in end-to-end relation portions of two lengths of wire each forming a bulk supply of coiled form, such junction being effected by friction welding a short wire insert of the same cross-sectional dimension as the wire contained in the two bulk supplies to free end portions of the latter, the insert being rotated whilst the wire contained in the bulk supplies remains stationary so far as rotation is concerned.

In this specific application of a friction welding apparatus it is important that an insert workpiece and that the free end portions of the outer workpieces should be supported close to the planes at which the welded junctions are to be effected.

Further, and generally, the establishment of a satisfactorily welded junction by friction welding between relatively rotated workpieces of a given material, for example mild steel, requires that the speed of relative rotation (measured as the peripheral speed at the circumferential face of the workpieces, or of the smaller of the two workpieces if these are of unequal diameter, shall be at least 300 ft. per minute).

As the diameter of the workpiece concerned decreases the adherence to this requirement necessitates an increasing rate of angular rotation between the workpieces and for small diameters, for example 0.15 inches, this may be as high as 12,000 revolutions per minute.

The arrangement of roller elements included in the central support 40 is designed to overcome such difficulties. The workpiece receiving aperture is defined by three roller elements, two of which comprise driving roller elements 45 which define therebetween a central rest or cradle 54 affording an upwardly presented channel 55, the profile of which matches that of the channels 25a, 25b of the rests or cradles of the end supports 20a, 20b. These driving roller elements 45 are entirely free and are not supported by any bearings whatsoever. Instead they are supported solely by respective nondriven backing roller elements 131 and a common driving backing roller element 132. The third roller element defining the workpiece receiving aperture comprises a composite roller element 50 disposed above the cusp-shaped channel 55 and movable towards and away from the free roller elements 45.

The roller elements 45 are of a length to extend immediately adjacent to planes 18, 19 coincident with the contacting end faces of the workpieces being joined and provide continuous support to the central workpiece for substantially the whole length thereof.

The diameters of the free roller elements 45 are selected to be within a range, the upper limit of which permits the smallest diameter workpiece, which is required to be handled in the apparatus, to lie in such position in the workpiece receiving aperture that its upper extremity is not so far below the upper extremities of the free roller elements 45 as to be incapable of being contacted by the composite roller element 50 before the latter contacts the free roller elements 45. Typically the upper extremity of the workpiece of the smallest diameter required to be handled would be situated not lower than about one-third of the depth of the cusp defined by the circumferential faces of the free roller elements 45.

The lower limit of diameter of the free roller elements 45 is selected with reference to the criteria of allowing these to be driven at a sufficiently low angular rate of rotation to avoid difficulties through any out-of-balance forces and high kinetic energy militating against rapid acceleration and braking, and to attain a satisfactory service life having regard to the fact that as the diameter of these roller elements is decreased so is the wear rate increased. Typically their diameters are about five times the diameter of the smallest diameter workpiece to be handled, and at least twice that of the largest diameter workpiece to be handled.

The free roller elements 45 are themselves supported from the body part 41 of the central support 40 by only the backing roller elements 131, 132. The backing roller elements 132 is of larger diameter than the backing roller elements 131 and supports both free roller elements 45, whereas the smaller diameter backing roller elements 131 support respective free roller elements 45.

The backing roller elements 131 have a diameter at least twice that of the free roller elements 45 which they support and do not present any inconvenience as regards their own support, in as much as they can be carried from the body part of the central support 40 by internal bearing means. Thus, spindles 133 enter the interiors of the backing roller elements 131 and, preferably, are equipped with ball or roller bearing units 135 disposed in the interiors of the backing roller elements 131. These backing roller elements are axially shorter than the free roller elements 45 which they support, and the spindles 133 are secured in upstanding lugs 134 on the body part 41 of the central support 40.

The larger diameter backing roller element 132 is splined to a shaft 82 which is supported at opposite ends in bearing assemblies 80 and 83 and is driven from a drive motor through a transmission means as hereinafter described. Thus the larger diameter backing roller element 132 serves to drive the free roller elements 45 and thereby drive a circular section central workpiece which is held in the channel 55 by the composite roller 50. It will be evident that the free roller elements 45 must not be allowed to contact each other, and that this is achieved by pressing the composite roller element 50 downwardly onto the central workpiece so that the latter tends to force the free roller elements 45 apart towards the backing roller elements 131 and thereby establish good frictional contact between the central workpiece and the free roller elements 45 and between the free roller elements 45 and the larger diameter backing roller element 132.

The smaller diameter backing roller elements 131 can be idle as shown or could be driven, if desired. In the latter case the transmission means connecting them to the motor or to the larger diameter backing roller 132 requires to provide a velocity ratio commensurate with the difference in diameters between the smaller diameter backing roller elements 131 on the one hand and the larger diameter backing roller element 132 on the other hand, or, more conveniently in this case, all these backing roller elements may be made of the same diameter and thus driven at the same angular speed of rotation.

Figure 3:
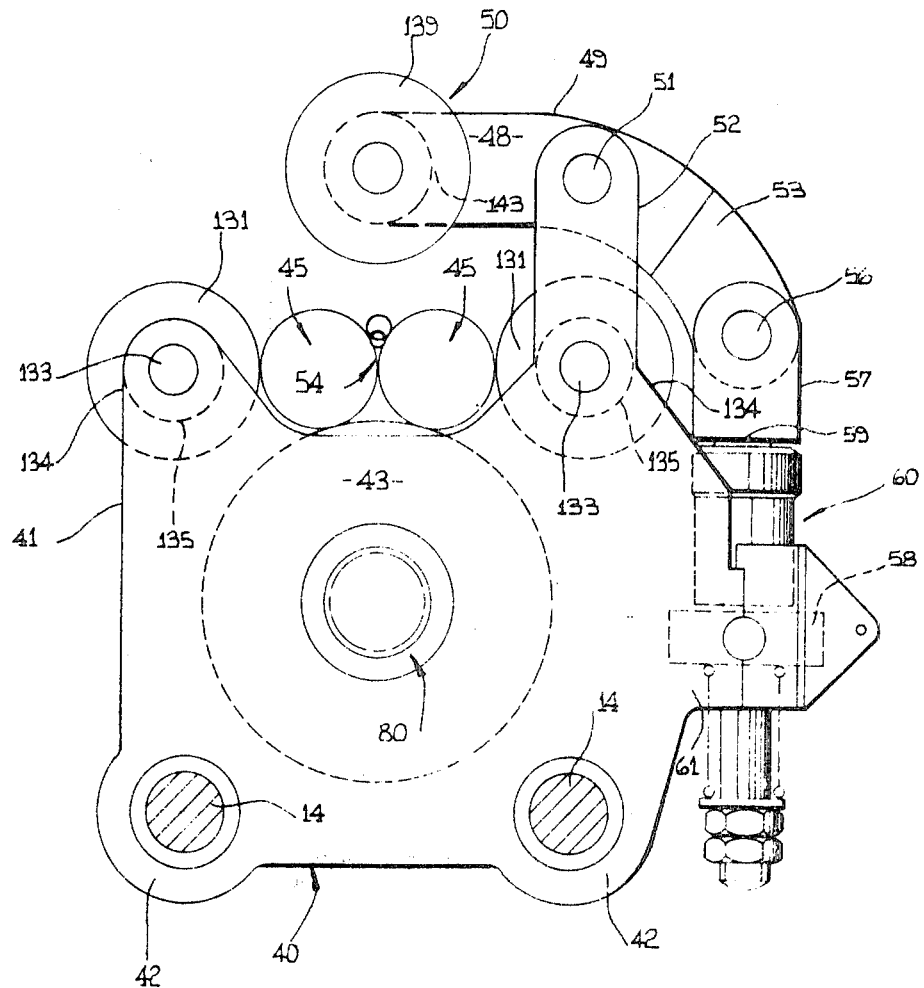
Figure 4:
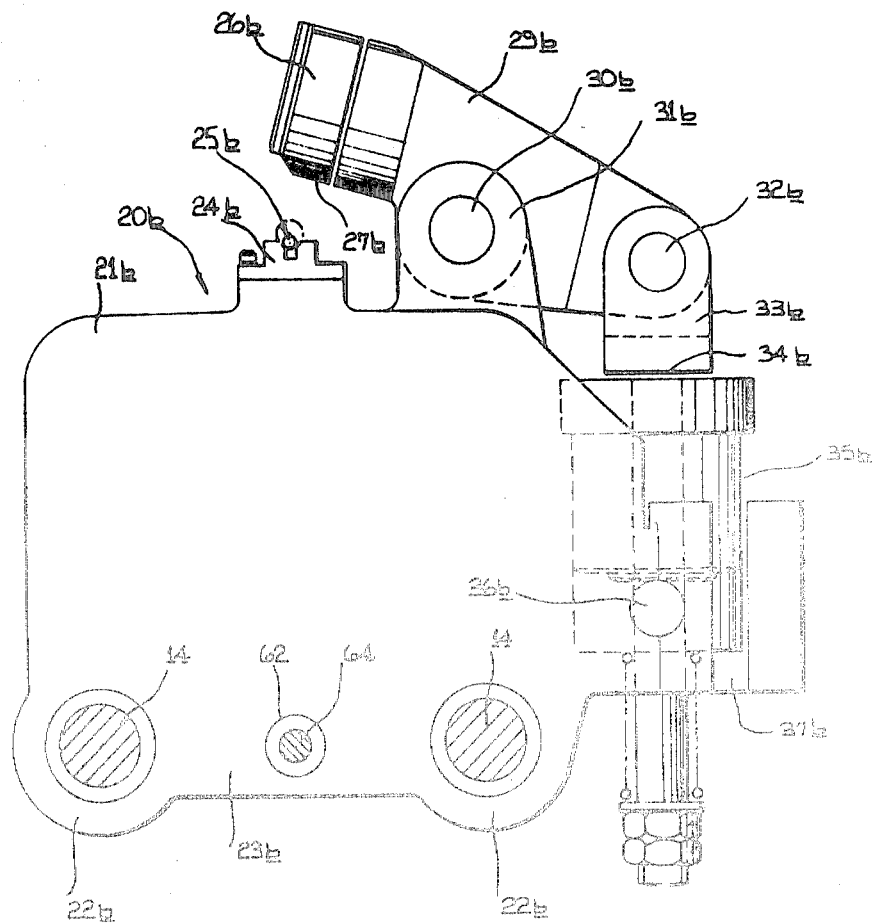
Figure 5:
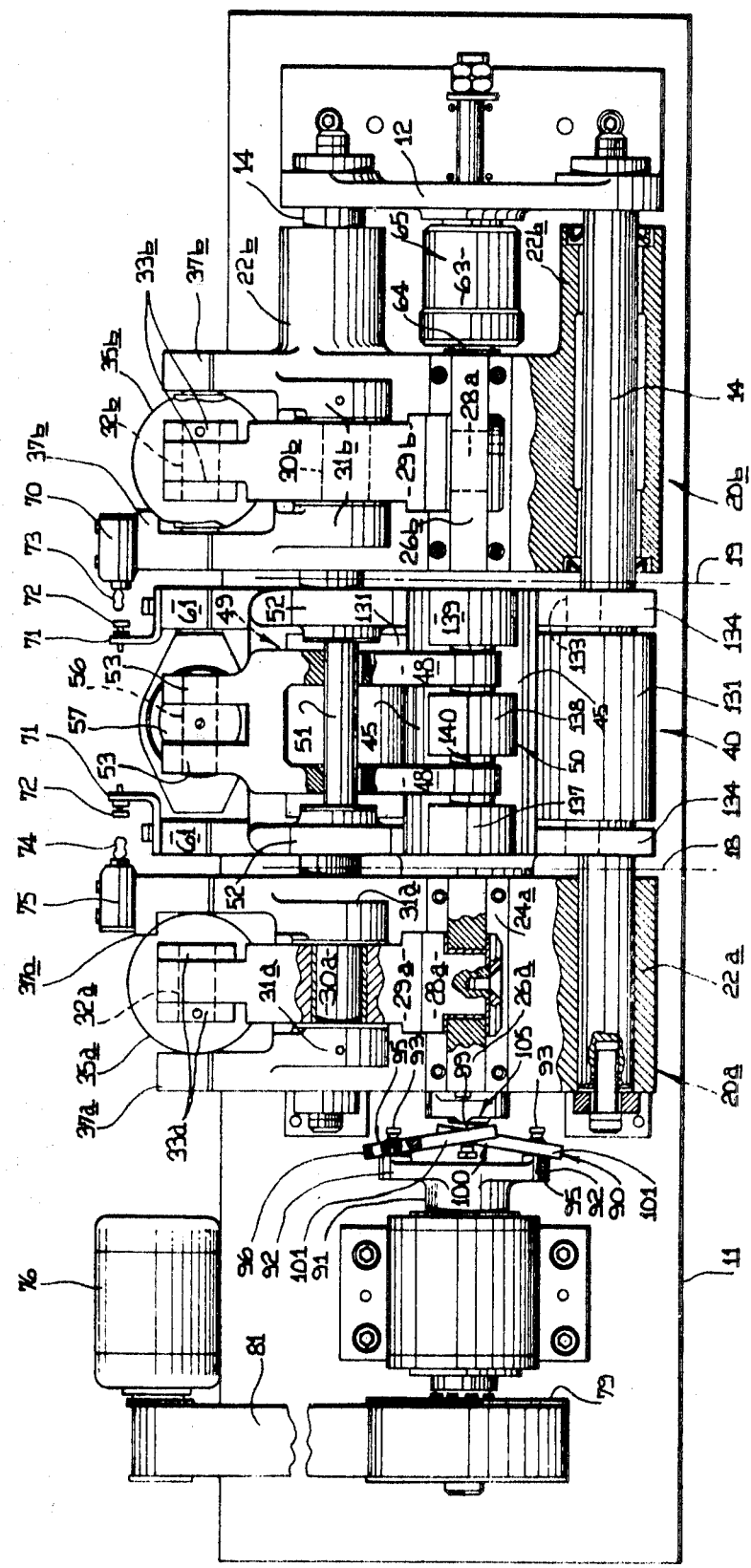
FIG. 5 is a plan view, partly in horizontal cross section, of the same apparatus.

Although the composite roller element 50 is of such a diameter that it can conveniently be supported by internal bearing means, these bearing means cannot conveniently be arranged at the extreme ends of the element because the latter should extend axially as close as possible to the welding planes 18 and 19. It is for this reason that the composite roller element 50 is subdivided axially into sections 137, 138 and 139 supported by internal bearing means comprising respective ball or roller bearing units 141, 142 and 143 on a common spindle 140 carried by the limbs 48 of a forked carrier arm 49 pivoted about a horizontally extending axis defined by a pivot pin 51 supported between trunnions 52 upstanding from the bridge portion 43 of the central support 40. The limbs 48 of the carrier arm 49 are disposed between the roller sections which comprise the composite roller 50 as best seen in FIGS. 1 and 5. The outer end of the forked carrier arm 49 has lugs 53 pivotally connected by a pin 56 to an eye 57 at the upper end of a piston rod 59 of a piston and cylinder unit 60 which is extendable and contractable to move the composite roller elements 50 downwardly into a closed position with respect to the free roller elements 45 and upwardly to an open position with respect thereto as shown in FIG. 3. The piston and cylinder unit 60 is itself supported on a cross member 58 pivotally supported between laterally projecting lugs 61 provided on the body part 41 of the central support 40.

In an alternative arrangement, all of the backing roller elements 131 and 132 may be idle, and drive may be transmitted to the central workpiece directly from an axially short driven roller element arranged to contact the workpiece directly from beneath. To achieve this the roller elements 45 and 132 would each be divided into two axially spaced sections to provide a central gap in which such short roller element would be disposed.

In any of these arrangements the rate of angular rotation which it is necessary to impart to the backing roller elements (or such short roller element) can be kept quite low, for example less than 1,000 r.p.m. and this minimizes balancing problems and acceleration and braking problems, especially if the roller elements are as far as possible made of hollow sleevelike form to minimize their moments of inertia.

One of the end supports 20a, on the left as seen in FIGS. 1 and 5, is screwed to the base 11 so that it is fixed relative to the guide bars 14. The other end support 20b, at the right-hand side as seen in FIGS. 1 and 5, has no such legs but only a body part 21b formed with the lugs 37b from which the piston and cylinder unit 35b is supported. This end support 20b is slidable longitudinally of the bars 14 by actuating means in the form of a piston and cylinder unit 65, the cylinder 63 of which is secured to the end plate 12 and the piston rod 64 of which is secured in a socket 62 formed in the bridge portion 23b of the adjacent end support 20b.

The piston rod 64 is held captive in the socket 62 by means of a grub screw 66 engaging in a slot 67 formed in the piston rod. The latter bears against distance piece 68 in a recess 69. This distance piece may be either a simple thrust block or a load cell of the hydraulic or electrical type to provide a signal which is a function of the thrust exerted on the end support 20b by the piston and cylinder unit 65.

The central support 40 is free to slide along the guide bars 14.

In the machine illustrated the central support 40 carries two brackets 71 bearing stop screw 72 to operate the plungers 73 and 74 of limit switches 70 and 75 mounted on the end supports 20a, 20b respectively, and connected in a control circuit.

The free roller elements 45 are driven from a motor unit 76 including an electrical motor and a disc brake through the intermediary of a transmission means which accommodates axial movement of the free roller elements 45 due to movement of the central support 40.

Such transmission means include an input shaft 77 supported by a bearing assembly 78 mounted on the base plate 11. The shaft 77 carries an input driving pulley 79 driven by a belt 81.

Coaxially with the input shaft 77 is disposed an output shaft 82 which carries the larger diameter backing roller element 132 and is supported at its end adjacent to the input shaft by the bearing assembly 83 in a tubular extension 84 of the bridge portion 43 of the central support 40 disposed between the posts 13 which form part of the end support 20a. At its opposite end the output shaft 82 is supported by the bearing assembly 80 in the bridge portion 43 of the central support.

The input and output shafts are connected to each other by coupling means 90 comprising a driving element 88 and a driven element 89. The driving element comprises a hub including a boss portion 91, and a radial flange or a pair of laterally extending arms 92.

These arms 92 carry axially projecting pins 93 extending towards the driven coupling element 89 and are both furnished with the ball member 94 of a universal joint 95.

The driven element 89 is of similar construction and comprises a hub including a boss portion 97 and a radial flange or a pair of laterally extending arms 98. These arms 98 carry axially projecting pins 99 extending towards the driving element 88 and are both furnished with the ball member 104 of a universal joint 105.

The coupling further comprises torque transmitting means 100 in the form of two bars 101 which are apertured adjacent to each end. These bars 101 extend between the pins 93 and the pins 99, the apertures receiving liners 96 and 106 with part-circular concave surfaces which form the socket members of the respective universal joints 95 and 105 and can swivel universally on the ball members 94 and 104 thereof.

Figure 2:
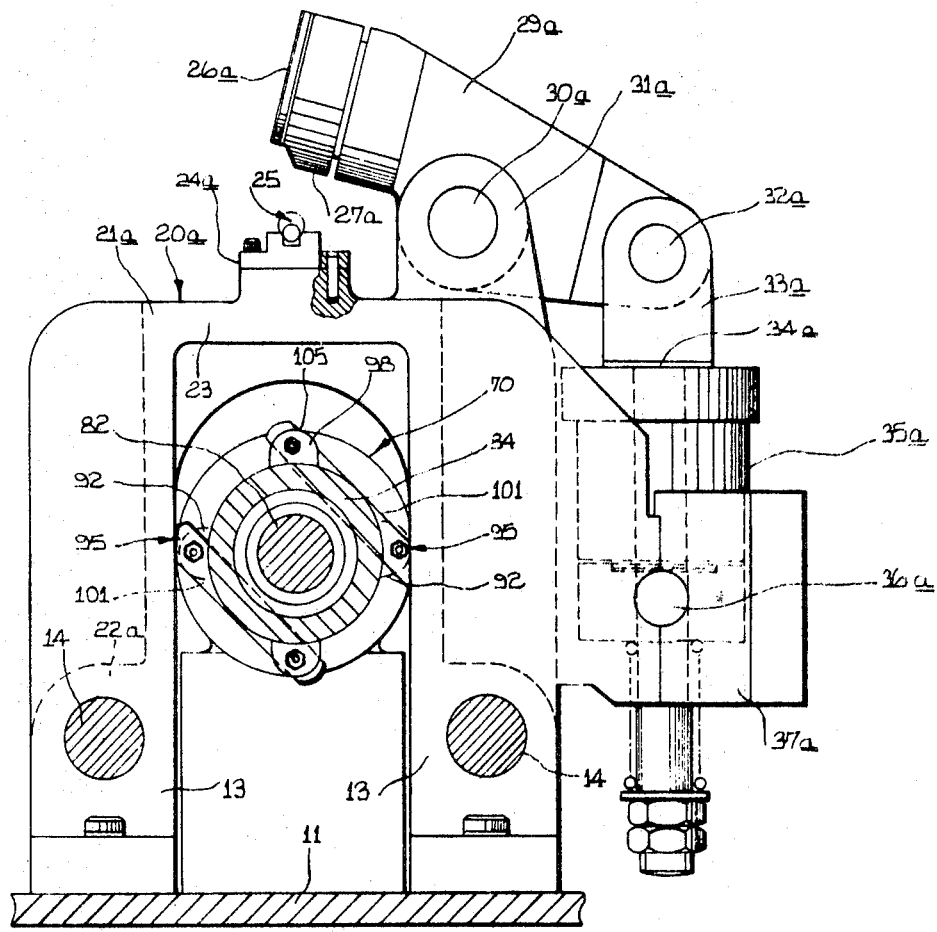
FIGS. 2, 3 and 4 are cross-sectional views of the apparatus respectively on the lines II—II, III—III and IV—IV of FIG. 1.

The arms 92 and 98 which carry the pins 93 and 99 are angularly offset from each other by about 90° as best seen in FIG. 2.

When relative axial movement takes place between the driving and driven elements 88 and 89 the only frictional resistance is presented by the contacting surfaces of the ball members 94, 104 and the seatings of the respective socket members 96, 106 in contact therewith. Due to the lengths of the bars 101 there is a substantial leverage which ensures that very little, if any, frictional resistance to axial movement occurs.

In using the apparatus to carry out the method of the invention, end portions of two bulk supplies of wire, which may be in coil form are clamped in the rest or cradle members 24a, 24b by the clamping plates 26a, 26b of the end supports 20a, 20b and an insert length of wire is placed in the cusp section channel 55 afforded by the free roller elements 45 and pressed downwardly onto these by the composite roller element 50, all by appropriate energization of piston and cylinder units 35a, 35b, and 60. The insert length of wire is rotated by the free roller elements 45 driven from the motor 76 through the input shaft 77, the coupling means 90, and the output shaft 82.

The piston and cylinder unit 65 is pressurized initially to establish a low value of axial thrust. During this stage the end faces of the clamped end portions of the wire are cold and relatively rough, giving rise to a higher torque resistance to rotation than occurs at later stages of the process. Thus a comparatively low pressure is applied to the piston and cylinder unit 65 so that the workpieces are held in contact with a pressure sufficient to heat the contacting faces up to about red heat and smooth out local rough spots. If too high a contact pressure is applied while the end faces are still rough, the central workpiece may be held against rotation.

After the low pressure contact has been maintained for a sufficient time the pressure of fluid in the unit 65 is increased preferably but not essentially in a linear manner for time preselected item to a preselected higher value.

Rotation of the roller elements 45 is then stopped by deenergization of the driving motor and application of the disc brake included in the motor unit 76, and the value of thrust is still further increased to effect the actual welding operation.

It will be appreciated that a generally similar apparatus can be employed for friction welding of only two workpieces. In this case there would be only a single fixed support and only one movable support, the fixed support preferably including the rollers comprising the drive means and the movable support including clamping means. Moreover, a generally similar apparatus and method can be used for friction welding two or three workpieces other than lengths of wire as previously mentioned. Where all three workpieces are of circular section there is a particular problem in designing clamping means for the end supports capable of handling wires or other workpieces of a range of diameters, in that all three workpieces must be accurately aligned on a common axis coincident with the axes of rotation of the central workpiece. However, where other or noncircular section workpieces are to be joined by a central shaft or rod, individually designed clamps can readily be provided to replace those of the end supports 20a, 20b described previously. Thus, to make a prop shaft having forked coupling members at each end with the forks at one end lying in a plane at a preselected angle to the plane containing the forks at the other end, the clamping means can be arranged to hold the respective forked coupling members in the correct relative orientation and the shaft proper can be mounted in a central support generally similar to that described above.

We claim:

1. Friction welding apparatus for joining at least one first workpiece to a second workpiece of circular cross section and having an exterior curved surface and a longitudinal axis, said first and second workpieces having respective end faces to be joined, the apparatus comprising:
 a. a supporting structure,
 b. workpiece support means on said supporting structure for holding the respective workpieces with their end faces in contact with each other,
 c. said workpiece support means for said second workpiece comprising a workpiece locating means including a plurality of roller elements arranged at positions spaced apart angularly about said axis of said second workpiece and collectively defining an aperture in which said second workpiece can be located against radial movement,
 d. each of said roller elements having an exterior curved face with a diameter a plurality of times greater than that of the maximum diameter workpiece capable of being held by said workpiece locating means, and
 e. at least two of said roller elements defining said aperture and occupying angularly successive positions comprising free roller elements which are supported only by a plurality of backing roller elements rotatably carried by said second workpiece support means,
 f. driving means for rotating said second workpiece about said axis relative to said first workpiece, said driving means including means for rotatably driving at least one of said roller elements of which the exterior curved face engages said exterior curved surface of the second workpiece to cause the latter to be rotated due to frictional engagement with said driving roller element, and
 g. means for effecting relative axial movement between said workpiece support means to maintain sufficient pressure between the end faces of said workpieces to enable same to be friction welded to each other.

2. Friction welding apparatus according to claim 1 wherein said backing roller elements each have a diameter a plurality of times greater than that of the free roller elements which they support.

3. Friction welding apparatus according to claim 2 wherein at least one of said backing roller elements is rotated by said driving means so as to drive at least one of said free roller elements which in turn drives said second workpiece.

4. Friction welding apparatus according to claim 2 wherein one of said backing roller elements is driven by said driving means and said one roller element is of greater diameter than the remaining roller elements.

5. Friction welding apparatus according to claim 1 wherein said second workpiece support means includes two free roller elements each of which are supported by a respective backing roller element having a diameter at least twice that of the free roller elements together with a further common backing roller element of larger diameter than said other backing roller elements, said larger diameter backing roller element being rotated by said driving means.

6. Friction welding apparatus according to claim 1 wherein a remaining one of said roller elements which in combination define said workpiece receiving aperture is mounted on means enabling it to be moved relatively towards and away from said free roller elements into a closed position in which said remaining rotary element engages the second workpiece and maintains the latter in pressure contact with said free roller elements, and an open position in which the workpiece to be rotated can be inserted laterally into said workpiece locating means and the welded assembly of workpieces can be removed therefrom, the diameter of said remaining roller element being greater than that of said free roller elements and said remaining roller element being supported by internal bearing means spaced axially from the ends of said remaining roller element which is thereby adapted to support the central workpiece immediately adjacent to the ends of the latter.

7. Friction welding apparatus according to claim 6 wherein said remaining roller element is a composite roller element and includes a plurality of axially spaced roller sections supported by respective internal bearing means on a shaft which is supported between said roller sections.

8. Friction welding apparatus for joining together two end workpieces by the interposition of a central workpiece of circular section having an exterior curved surface and a longitudinal axis, said end and central workpieces having respective end faces to be joined, the apparatus comprising:
   a. a supporting structure,
   b. respective end workpiece support means on said supporting structure for holding said end workpieces in alignment with one another in axially spaced relation,
   c. a central workpiece support means on said supporting structure and disposed between said end workpiece support means for holding said central workpiece with its end faces in contact with said end faces of the end workpieces,
   d. said central workpiece support means comprising a workpiece locating means including a plurality of roller elements arranged at positions spaced apart angularly about said axis of said central workpiece and collectively defining an aperture in which said central workpiece can be located against radial displacement,
   e. each of said roller elements having an exterior curved face with a diameter a plurality of times greater than that of the maximum diameter central workpiece capable of being held by said workpiece locating means, and
   f. at least two of said roller elements defining said aperture and occupying angularly successive positions comprising free roller elements which are supported only by a plurality of backing roller elements rotatably carried by said central workpiece support means,
   g. driving means for rotating said central workpiece about said axis relative to said end workpieces, said driving means including means for rotatably driving at least one of said roller elements of which the exterior curved face engages the exterior curved surface of the central workpiece to cause the latter to be rotated due to frictional engagement with the driving roller element, and
   h. means for effecting relative axial movement between said workpiece support means to maintain sufficient pressure between the end faces of said workpieces to enable same to be friction welded to each other.